United States Patent [19]

Williams

[11] Patent Number: 4,532,560
[45] Date of Patent: Jul. 30, 1985

[54] APPARATUS AND METHOD FOR INDICATING TAPE TIME

[75] Inventor: Marshall Williams, Fremont, Calif.

[73] Assignee: Ampex Corporation, Redwood City, Calif.

[21] Appl. No.: 418,890

[22] Filed: Sep. 16, 1982

[51] Int. Cl.³ .................. G11B 15/18; G11B 27/14
[52] U.S. Cl. .................... 360/72.3; 360/13; 360/14.1; 360/137; 377/18
[58] Field of Search .............. 360/13, 14.1, 14.2, 360/14.3, 33.1, 72.1, 72.3, 137, 74.2, 72.2; 369/30, 32, 33; 377/18, 24, 33; 358/185, 335, 337

[56] References Cited

U.S. PATENT DOCUMENTS

| | | | |
|---|---|---|---|
| 4,225,890 | 9/1980 | Takenaka et al. | 360/72.1 |
| 4,340,916 | 7/1982 | Menezes | 360/14 |
| 4,360,843 | 11/1982 | Menezes et al. | 360/14.3 |
| 4,386,379 | 5/1983 | Smith et al. | 360/72.3 |
| 4,394,745 | 7/1983 | Menezes et al. | 360/14.1 |
| 4,417,135 | 11/1983 | Motoyama et al. | 377/18 |
| 4,446,495 | 5/1984 | Orimoto et al. | 360/72.1 |
| 4,473,853 | 9/1984 | Corkery | 360/14.3 |

OTHER PUBLICATIONS

Journal of the SMPTE, "Videotape Editing Systems Using Microprocessors", vol. 87, Jun. 1978, by K. J. Hamalainen, pp. 379-382.

Primary Examiner—Raymond F. Cardillo, Jr.
Assistant Examiner—Steven R. Garland
Attorney, Agent, or Firm—Elizabeth E. Strnad; Ralph L. Mossino

[57] ABSTRACT

A magnetic tape timer and method wherein the measured tape time as well as stored cue markers are not affected upon receiving a preset or reset signal. An offset signal is generated and stored as a difference between the preset or reset signal and a tape time which is coincident with receiving the preset or reset signal. The tape time, cue markers and other tape time related values are then modified by the offset signal for further use such as for display.

38 Claims, 5 Drawing Figures

FIG_2

FIG_3

APPARATUS AND METHOD FOR INDICATING TAPE TIME

BRIEF DESCRIPTION OF THE PRIOR ART

The invention relates to an apparatus and method for indicating tape time as it is known to be useful in magnetic tape recording/reproducing devices to provide information related to the position of a particular location on the magnetic tape within the device.

Tape timers are devices generally utilized to provide information of the longitudinal position of a magnetic tape in a magnetic tape recorder with respect to a reference location within the recorder, usually related to the location of the magnetic head. When manipulating the magnetic tape, such as during recording, playback, editing or similar operations it is often necessary to move the tape to a desired position with respect to the magnetic head. Therefore it is necessary to determine in what direction and how far the tape has to move to obtain the desired position. It is customary for the above indicated purpose to define certain reference points on tape, generally referred to as cue markers. For the convenience of the operator such cue markers are often defined and displayed as time values indicating the time necessary for the tape to move in one or the opposite direction from a conveniently selected reference point on tape.

For example such cue markers may indicate the beginning or end of various inserts, changes or deletions of recorded information on tape and are known to be utilized during certain edit operations, when for example a portion of recorded information on one tape is re-recorded from that tape to a specific location on another tape. As well known, in editing of high quality recordings, such as in broadcast quality professional audio or video tape applications, the transition between a previous recording and the newly inserted recording on the tape must not be detectable to the listener or viewer. Consequently, prior to re-recording both recorders have to be synchronized and brought up to full speed during a time interval, generally known as preroll after which the re-recording takes place. That interval may differ for different recording/reproducing devices. The beginning of a preroll time is generally referred to as park which indicates a point on tape preceding a cue marker by the preroll interval.

In the prior art tape recorders it is known to store such cue markers in a memory and to utilize them when necessary to determine the direction and distance by which the tape has to move from its present location to a location designated by the cue marker.

For the convenience of the operator it is customary to display the present location of the tape within the recording/reproducing device in time values, that is in hours, minutes, seconds, and in the case of video recording, also in frames per second. The latter time values indicate how much time is needed at playback speed, for the tape to move from the present position to a reference point defined as tape time equal to zero.

In the prior art tape timers it is also known to enter external cue markers for example from an operation panel of an editing device, in time dimensions, that is in hours, minutes, seconds and in case of television recording, also in frames per second. These time values are then converted to corresponding binary values and stored in the cue marker memory for further use.

There are known tape timers capable of storing in the order of hundreds of cue markers, each referring to a particular point on tape. Edit decisions referring to these cue markers are usually maintained in the form of edit decision lists for future reference and use by the operator.

During processing of the magnetic tape recording such as during edit-related operations it often becomes necessary to change the tape time information as displayed. In the prior art tape timers such change has been introduced by applying a preset or reset signal directly to a counter utilized to count the tachometer output pulses or similar pulses indicating tape speed in a well known manner. Generally, reset may be considered as being a special instance of preset operation where the particular preset value is equal to zero. Upon receiving a preset signal the content of the counter in the known tape timers has been changed to that specific preset value in a well known manner. Alternatively, upon receiving a reset signal the content of the counter has been reset to zero. In both cases the counting resumed thereafter from that new reference. Consequently the previously prepared edit decision lists were no longer valid since they did not correspond to the updated tape time and had to be changed accordingly. Similarly, the previously stored cue marker values in the memory no longer related to the originally designated locations on tape and therefore had to be updated correspondingly.

BRIEF SUMMARY OF THE INVENTION

Consequently it is an object of the present invention to eliminate the above indicated disadvantages of the prior art tape timing devices and methods.

In accordance with one important aspect of the invention the count related to tape time remains unmodified when a preset or reset signal is received by the tape timer. An offset signal is provided and stored as a difference between a preset or reset value and the immediate count at the time of receiving the preset or reset signal. The current count is thereafter modified by that offset signal for display.

In accordance with a further important aspect of the invention cue markers are stored as being related to the unmodified count and they do not change upon receiving a preset or reset signal. When it is desired to display a stored cue marker, it is retrieved from the memory and modified by the above mentioned offset value for display or other use.

According to another important aspect of the invention cue markers may be entered from an external input into the tape timer for storage and display. Each such external cue marker is modified by the above mentioned offset prior to being stored in the memory. In the preferred embodiment the latter modification is provided in a sense opposite to the above described modification of the current count related to tape time as will follow from a more detailed description.

In accordance with a further important aspect of the invention the distance and direction of tape travel which is necessary to obtain a selected cue marker is determined by comparing the selected cue marker with the unmodified current count and the resulting difference corresponds to the distance and direction of necessary tape travel.

It is an important advantage of the present invention that the respective above-indicated and various other values related to tape time may be displayed as related to preset or reset values while not changing or modifying the count related to measuring the positon of the magnetic tape within the recording/reproducing device. At the same time stored cue markers also remain unchanged within the memory with respect to a preset or reset signal received by the tape timer.

In the preferred embodiment of the tape timer illustrated in the drawings of the application and discussed in detail below, a binary counter receives an information signal related to tape travel within a tape recording/reproducing device, for example supplied by a capstan tachometer (not shown) in a known manner. The counter provides a count proportional to that signal. In response to a preset or reset signal received by the tape timer an offset signal is generated and stored as a difference between an immediate content of the counter and that preset or reset value while the count within the counter remains unchanged. Cue markers are stored in a memory as values related to the content of the counter and thus they are not altered by a received preset or reset signal. A distance and direction to a cue marker is determined and may be displayed as a difference between a stored cue marker value and the counter content since both latter values are unaltered by a preset or reset signal. The tape time is displayed as a current counter content modified by the offset value and the cue marker value is displayed as a stored cue marker which is also modified by the offset value.

The tape timer of the preferred embodiment may operate in various modes, such as storing cue markers internally obtained from the counter, storing externally applied cue markers, determining a distance and direction on tape to a cue marker, adjusting the distance and direction to a cue marker by a preroll value, and many other modes including displaying these and other tape time related values as it will be described later in detail.

Other objects, features and advantages of the invention will be apparent from the following description and accompanying drawings.

DETAILED DESCRIPTION

The preferred embodiment of the apparatus and method of the invention will be described with reference to the block diagram shown in FIG. 1. A binary counter 10 is utilized which receives on line 12 tachometer pulses from a conventional tachometer (not shown). The tachometer is utilized in a magnetic tape recording/reproducing device (not shown) in a manner well known in the art to supply pulses which are proportional to the rotational speed of the capstan or tape timer idler utilized in the device. The latter speed corresponds to the longitudinal speed of the magnetic tape in a well known recording/reproducing device for example helical, transverse, longitudinal, etc. The counter 10 also receives on line 14 a high or low directional signal DIR for example from the capstan or idler indicating whether the tape is moving in a forward or reverse direction as it is well known in the art. Thus depending on the polarity of the directional signal on line 14 the counter 10 counts the pulses received on line 12 up or down and it applies the resulting binary count A on line 16 to one input of a binary adder and latch circuit 18 via an inverter 132 as well as to a first input of a binary adder 28. It is noted that this and other inverters utilized in the preferred embodiment of the invention preferably operate as two's complement inverters, that is, they invert a received binary number and add number one thereto. The up/down counter 10 rolls over every time it reaches its maximum or minimum count as well known in the art. The non-inverted output signal A from counter 10 is also applied via line 16 to a second input of binary adder 28 as well as to a cue marker storage circuit 20 also referred to as memory. A cue select control signal CS on line 22 and a set cue control signal SC on line 24 are respectively applied to the cue storage circuit 20. An output on line 26 from cue storage circuit 20 is connected to a second input of a binary adder 28.

A time to binary converter circuit 32 receives the following input signals in time format: on line 34 it receives a preroll value P1, on line 36 an external cue value CE and, on line 38 a preset value P. Circuit 32 converts the respectively received time values to correspoinding binary values and applies them to further circuit elements of FIG. 1 as follows. A first output signal P1 on line 40 from the time to binary converter circuit 32 is applied via an inverter 138 to one input of a latch and binary adder circuit 46. A second output signal CE on line 42 is applied to one input of a binary adder 48 and a third output signal P on line 44 from circuit 32 is applied to a second input of the binary adder and latch circuit 18. A reset signal R is applied in binary form on line 50 to the time to binary converter 32 and therefrom on line 30 to a reset input of the binary adder and latch circuit 18 respectively. A preset time signal PT is applied on line 52 to a preset input of the binary adder and latch circuit 18. An output signal corresponding to an offset signal B is applied by circuit 18 on line 54 to a fourth input of the binary adder 28 while also being applied via inverter 92 to a second input of binary adder 48. An output signal on line 56 from the binary adder 48 corresponding to an external cue marker value CE modified by the offset value B is applied to the cue storage circuit 20.

A first output signal from binary adder 28 corresponding to a current tape time value A modified by offset B is provided on line 60, a second output signal corresponding to a cue marker modified by offset B on line 62, and a third output signal corresponding to a distance and direction D to a cue marker is provided on line 64, respectively. Lines 60, 62 and 64 are coupled to respective separate inputs of a data selector circuit 66 while line 64 is also coupled to a second input of a latch and binary adder circuit 46. The circuit 46 also receives a preset preroll control signal PP on line 74. The output signal from circuit 46 corresponding to the difference between the respective signals (D−P1) indicating the distance and direction to park is applied on line 68 to the data selector 66. The data selector 66 receives on line 78 a display select control signal DS.

A binary to time converter 72 receives the output signal from data slector 66 on line 70. A control signal 60/50 Hertz frequency select FS on line 80 and a drop frame enable control signal DFE on line 82 are applied, respectively, to both the time to binary converter circuit 32 and binary to time converter circuit 72. The output signal from the binary to time converter 72 is applied on line 84 to a conventional display driver 86 which is connected via line 88 to a conventional display circuit 90. The tape timer information in time format on line 84 may also be utilized for external use.

Figure 1:
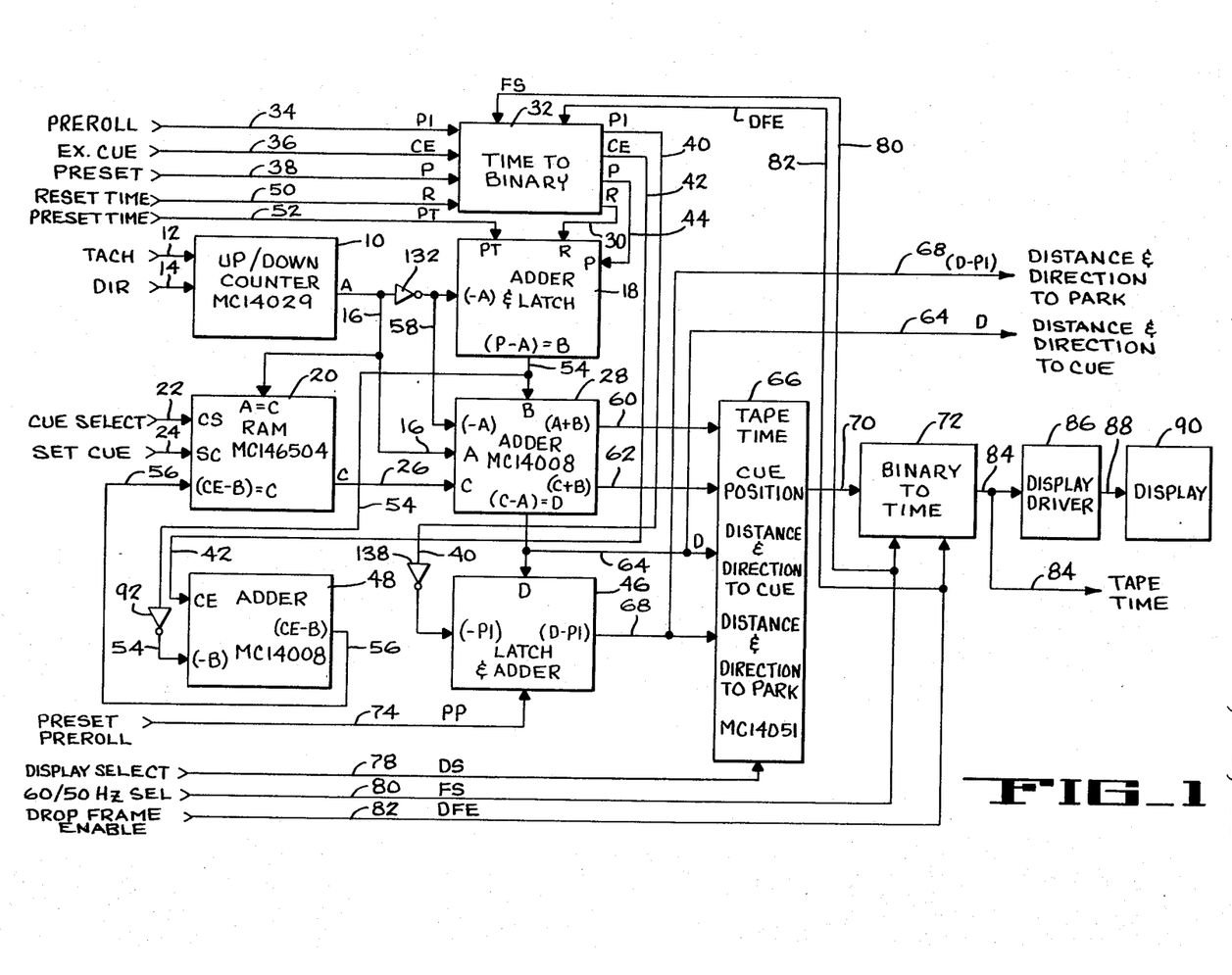
FIG. 1 is a block diagram of a preferred embodiment of the tape timer apparatus of the preset invention.

The various elements of the block diagram in FIG. 1 are for example implemented and operate as follows. A 32-bit binary up/down counter is utilized, for example type MC14029 as counter 10, which provides on output line 16 an up or down count of the tachometer pulses received on line 12, depending on the polarity of the direction control signal DIR on line 14. It is noted that the respective components herein described which have type numbers starting with prefix "MC1" are manufactured by Motorola Semiconductor Products Inc. The cue storage circuit 20 is implemented for example by random access memory, further referred to as RAM, for example type MC146504. Cue marker values are received by memory 20 via line 16 or 56 respectively. A cue value received on either of these lines is stored in memory 20 in response to a set cue control signal SC received on line 24. The later represents a write in memory control signal. The received cue value will be stored in memory 20 at an address designated by cue select signal CS on line 22, also referred to as address line. In the preferred embodiment of FIG. 1 up to 128 32-bit cue markers can be stored in the memory 20. However, it will be understood that if it is necessary to store a larger number of cue markers a memory having a larger capacity may be utilized. As adders 28,48, respectively, binary adders type MC14008 may be utilized. Thus binary adder 48 receives the first input signal CE on line 42 and the second, invertered input signal (−B) on line 54 respectively, and it provides an output signal (CE−B) on line 56. Binary adder 28 receives the input signal A on line 16, the inverted input signal (−A) on line 58, the input signal C on line 26 and the input signal B on line 54, respectively. It provides a first output signal (A+B) on line 60, a second output signal (B+C) on line 62 and a third output signal (C−A)=D on line 64, respectively.

Figure 2:
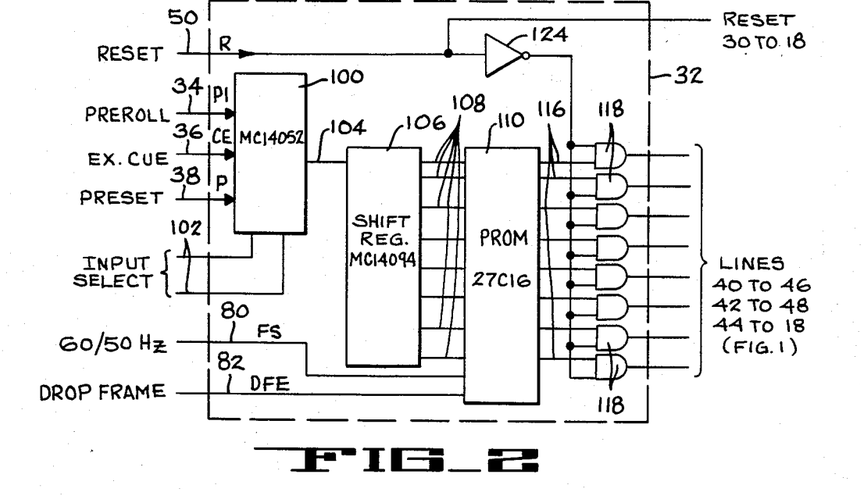
FIGS. 2 to 5 are detailed electrical circuit diagrams related to various portions of the block diagram of FIG. 1.

Portions of the block diagram of FIG. 1 will be described with reference to more detailed electric circuit diagrams shown in FIGS. 2 to 4, respectively. It is noted that corresponding circuit elements in the various Figures are designated by like reference numerals. An example of a more detailed circuit diagram of the time to binary converter circuit 32 is shown in FIG. 2 and will be described below. A multiplexer for example type MC14052 receives the previously described input signals P1, CE and P on lines 34,36, and 38 respectively in the form of serial data bits corresponding to the time format values of these signals. One of these input signals is selected via control lines 102 for example by an operator from a control panel (not shown) as it is well known. The selected input signal is applied by multiplexer 100 via output line 104 to shift register 106 for example type MC14094. The serial input signal on line 104 is transferred by the shift register 106 via parallel lines 108 as a parallel output signal to a programmable read only memory 110 further referred to as PROM. The memory 110 is for example type 27C16 manufactured by National Semiconductor Corporation. In the preferred embodiment respective look up tables (not shown) are stored in the programmable read only memory 110 which are utilized for the binary to time conversion each for one of the following combinations of the respective control signals FS and DFE on lines 80,82 respectively. For example a first table is employed for NTSC television signal system where a 60 Hz frequency is selected on line 80 and the DFE signal is valid on line 82. A second conversion table is employed for PAL television signal where 50 Hz is selected on line 80 and there is no DFE signal while a fourth table may be utilized for a PAL-M television signal for which a 50 Hz frequency is selected on line 80 and a DFE signal is valid on line 82. While the particular control signal combination on lines 80, 82 for NTSC system is similar to that of PAL-M system and the combination for PAL system is similar to that of SECAM system, different look up tables are necessary with respect to the well known differences between the various characteristics of these signal systems. Thus depending on the particular high/low signal combinations on control lines 80 and 82 one of these look up tables is utilzed in the PROM 110 to provide an output signal in binary form on lines 116 which corresponds to the time signal received on line 108. The 8-bit parallel binary signal provided on lines 116 is then applied via AND gates 118 to output lines therefrom corresponding to lines 40, 42 and 44 of FIG. 1 respectively.

The frequency select control signal FS on line 80 in the preferred embodiment of FIGS. 1 to 4 will be now described in more detail, followed by the description of the drop frame enable signal DFE on line 82 respectively. As it is well known the number of frames per second may differ in the various known television signals systems, such as in NTSC, PAL, PAL-M, SECAM, etc. Consequently when converting such signals from time to binary format and alternatively from binary to time format, such differences in the frequency rate must be considered if an accurate conversion is to be obtained. For example in the NTSC system the frame rate of the television signal is less that 30 frames per second by a fraction of a frame while in PAL system it is 25 frames per second. When it is required to maintain a fixed phase relationship of the television signal to real time and thus to compensate for the non-integral number frame rate in NTSC system it is known to use a 30 frames per second rate and to drop two frames once every minute except every tenth minute. Consequently in the preferred embodiment the drop frame enable control signal DFE is high or valid when the tape timer operates in an NTSC or PAL-M system and it is low when utilized in the other systems.

Referring now to the 60/50 Hz frequency select control signal FS on line 80 it is high when the tape timer of the present invention is utilized in a 60 Hz television network and it is low when utilized in a 50 Hz network. However, in PAL-M system which itself is a 60 Hz system the 50 Hz FS signal on line 80 may be utilized in combination with a high DFE signal on line 82.

The output signal from the PROM 110 is provided on line 116 in the form of an 8-bit parallel output signal. That output signal on line 116 is applied to one input of AND gates 118. It follows from the above-described operation of the data selector/multiplexer 100 of FIG. 2 that the output lines from AND gates 118 correspond to any of the output lines 40,42 or 44 of the time to binary converter circuit 32 of FIG. 1 as it will be described in more detail below.

The previously mentioned reset signal R received on line 50 of FIG. 1 is shown in FIG. 2 as being applied via an inverter 124 to a second input of each AND gate 118, respectively. Thus when a high reset signal is received on line 50 it is inverted by inverter 124 and the inverted low signal causes all AND gates 118 to provide a low output signal.

Now as an example a more detailed circuit diagram of the binary adder and latch circuit 18 of FIG. 1 will be described with reference to FIG. 3. A binary adder 130 receives at its first inputs the inverted signal (−A) on line 58 from the binary counter 10 via inverters 132 and at its second input it receives preset signal P via lines 44 from the previously described time to binary converter circuit 32. The adder 130 consequently provides an output signal on lines 134 corresponding to a sum of its input signals, that is, B=P+(−A) as well known in the art. The output signal B on line 134 which corresponds to the offset signal is latched into a latch 136 in response to the preset time control signal PT applied on line 52 or reset time control signal R applied on line 30, respectively. Offset signal B is stored in latch 136 and it is available for further use on output lines 54 therefrom. As an example adder 130 type MC14008 and latch 136 type MC14099 may be utilized.

Now a preferred implementation of the latch and binary adder circuit 46 of FIG. 1 will be described in more detail with reference to FIG. 4. A latch 140 prefereably of the type similar to latch 136 FIG. 3, receives via inverters 138 the preroll signal P1 on lines 40 from the time to binary converter 32 in the form of an 8-bit parallel signal. The inverted signal P1 is latched into latch 140 in response to a latch enable preset preroll signal PP on line 74. The latched signal P1 is applied via lines 142 to first inputs of adder 144. To the second inputs of adder 144 the previously mentioned output signal D=(C−A) from the binary adder circit 28 is applied via lines 64. A resulting output signal (D−P1) is applied via lines 68 to the data selector circuit 66 of FIG. 1.

The data selector 66 shown in FIG. 1 is preferably implemented by a multiplexer for example type MC14051. As mentioned previously it also receives from the binary adder 28 on line 60 the value (A+B), on line 62 the value (B+C) and on line 64 the value (C−A)=D, respectively. By the control signal DS on line 78 applied to the data selector 66 one of its input signals is selected to be applied to output line 70. The output signal on line 70 from the data selector 66 is applied to the binary to time converter circuit 72 which will be described now in more detail with reference to FIG. 5.

Figure 5:
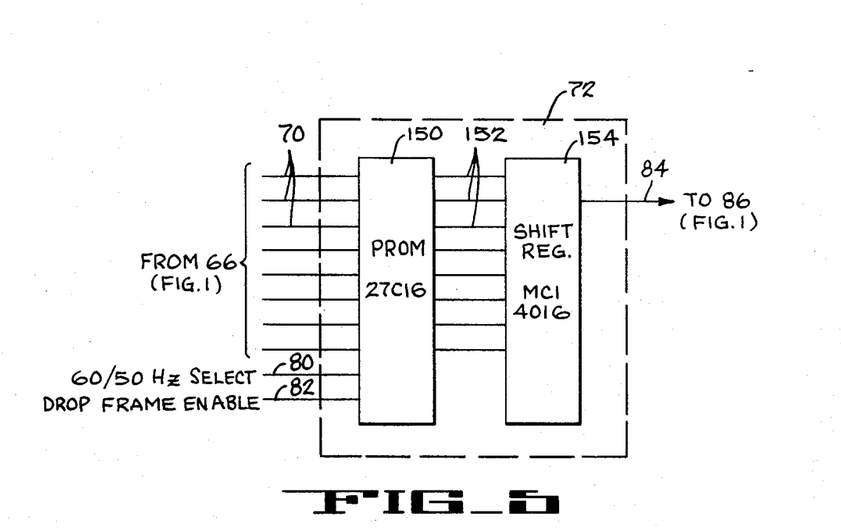

FIG. 5 shows a programmable read only memory 150, also referred to as PROM preferably of the same type as aboved described with reference to the PROM 110 of FIG. 2. Memory 150 receives the previously described output signal on line 70 from the data selecor 66 in the form of an 8-bit parallel signal. The programmable read only memory 150 comprises respective look up tables or maps (not shown) in which time values are assigned to binary input values received on the input lines 70. It will be understood that the look up tables are inversly related to those previously described as being contained in the programmable read only memory 32 of FIG. 1 since instead of converting from time values to binary values as it is the case in circuit 32, the look up tables in PROM of circuit 72 are programmed for conversion in the opposite direction that is from binary values to corresponding time values. The previously described control lines 80 and 82 coupled to programmable read only memory 110 of FIG. 2 are also coupled to the memory 150 of FIG. 5. Thus the latter control lines serve to select corresponding look up tables in both memories 110 and 150 depending on the hi/low combination of the respective control signals FS and DFE on lines 80 and 82 as described previously. The output signal from the programmable read only memory 150 which represents time values is applied via lines 152 in the form of a parallel 8-bit signal to a parallel to serial shift register 154, for example type MC14014, which provides a serial output signal on line 84 therefrom.

The thusly obtained output signal on line 84 is applied to a conventional display driver and display circuit 86,90, for example type DECO M26×256, manufactured by Chemetrics, a subsidiary of Millipore Corp. The signal on line 84 is thus displayed on display 90 in a well known manner.

In the following detailed description the apparatus and method of the present invention will be described with reference to various operation modes of the above described preferred embodiment of FIGS. 1 to 5. First an operation mode related to displaying tape time after receiving a preset signal P on line 38 will be described. When it is desired to change the value of tape time as displayed a preset value P is applied on line 38 for example by an operator from a conventional control panel (not shown) in a well known manner. Alternatively the value P on line 38 may be obtained from an automatic control circuit within the tape recorder (not shown) for example caused by absence of tape in the recorder or from an external source as for example an editor. In the preferred embodiement preset value P is received as a time value, that is, in hours, minutes, seconds and video frames per second. Alternatively, signal P could be represented as a time code which is recorded on the magnetic tape in a manner well known in the art. In response to a predetermined binary input select control signal on lines 102 shown in FIG. 2 the preset value P on line 38 is transferred by the multiplexer 100 via line 104 to the shift register 106 as a serial input signal. The shift register 106 provides a corresponding 8-bit parrallel output signal on lines 108 which is in turn applied to the programmable read only memory 110.

Depending on the particular high/low control signal combination of signals FS and DFE on line 80 and 82 a particular look-up table is selected in PROM 110 for the time-to-binary conversion as described previously. The resulting binary signal P is applied via lines 116 of FIG. 2 as an 8-bit parallel signal and via one input of AND gates 118 as a signal corresponding to that on line 44 of FIG. 1. It will be understood that when signal R on line 50 in FIG. 2 is absent the other inputs of AND gates are maintained high to obtain signal P therefrom. Returning now to FIG. 1 signal P on line 44 is applied to the binary adder and latch circuit 18 whose operation will be described below.

As mentioned previously the binary counter 10 of FIG. 1 provides an up or down count A on line 16 which is proportional to the capstan tachometer or tape timer idler signal received on line 12 from the magnetic tape drive mechanism (not shown) as it is well known in the art. As it is also known the counter 10 counts up when the control signal on line 14 is high indicating a forward motion of the magnetic tape and it counts down when a low signal on line 14 is received indicating reverse motion of the tape. As it has been mentioned previously, the direction signal DIR on line 14 is derived from the capstan tach or tape timer idler by means well known in the art. The count of the binary counter 10, designated as signal A is inverted by inverters 132 as shown in FIG. 3 and the inverted signal (−A) is summed with the above describerd preset signal P received on lines 44 in binary adder 130 shown in FIG. 3. Adder 130 thus provides a sum (P−A) which represent the above described offset B. In response to receiving a preset time control signal PT on line 2 the latch 136 of FIG. 3 is enabled. Consequently the output signal B from adder 130 on lines 134 is latched and stored in latch 136 and it is available on line 54 for further use in the circuit of FIG. 1, until a new preset value P is received on line 38 and the offset B changes accordingly.

Returning now to the circuit of FIG. 1, the above described offset signal B obtained on line 54 is continually summed in binary adder 28 with the current content A of counter 10 on line 16 and the resulting sum (A+B) of signals A and B is provided as an output signal on line 60 from the binary adder 28. It will be understood from the foregoing description that the signal (A+B) on line 60 represents a tape time value in binary form corresponding to the current content of counter 10 which is modified by the offset signal B. After being converted into time format in circuit 72 the thusly modified value (A+B) is suitable for display. It will be appreciated from the foregoing description that in accordance with the teachings of the present invention the content of the binary counter 10 itself does not need to be modified by a preset value P and only the tape time value as displayed is being modified to reflect the desired change.

With further reference to FIG. 1 the binary value (A+B) on line 60 representing the modified tape time is received by the data selector 66 and it is applied thereby to output line 70 as follows. In response to a predetermined binary display select control signal DS applied on line 78 to the data selector 66 the signal from line 60 is applied to line 70 which in turn applies it to the binary to time converter circuit 72 shown in FIGS. 1 and 5. Similarly as it has been described with respect to the time to binary converter circuit 32 of FIG. 2, the respective high/low combinations of the control signals on lines 80,82 applied to circuit 72 determine which one of the look up tables (not shown) utilized in the programmable read only memory 150 of FIG. 5 will be utilized for converting the binary data received on line 70 to corresponding time values. The resulting output signal from memory 150 on line 152 is applied in the form of 8-bit parallel binary data to shift register 154 of FIG. 5. As described previously shift register 154 converts the parallel data on line 152 to serial data on line 84 which serial data in turn is applied to the display drive 86 shown in FIG. 1.

Now an operation mode will be described in which the tape time is reset by a reset signal R. When it is desired to reset the tape time value as being displayed on display 90 of FIG. 1 to zero a reset control signal R in the form of a high signal is applied on line 50 to the time-to-binary converter 32 of FIG. 1. As it is shown in the more detailed circuit diagram of FIG. 2 the reset control R signal on line 50 is applied through an inverter 124 to one input of AND gates 118. As previously described the AND gates 118 receive at their second inputs a signal from the output of the programmable read only memory 110 on line 116. The reset control signal R on line 50 after being inverted is applied as a low level signal to interconnected second inputs of AND gates 118. Consequently independently of the signal value on lines 116 of FIG. 2, the output signal on output lines from AND gates 118 will be a low level signal. The latter output lines thus correspond to line 44 of FIG. 1 coupled to the preset input of adder 18.

Figure 3:
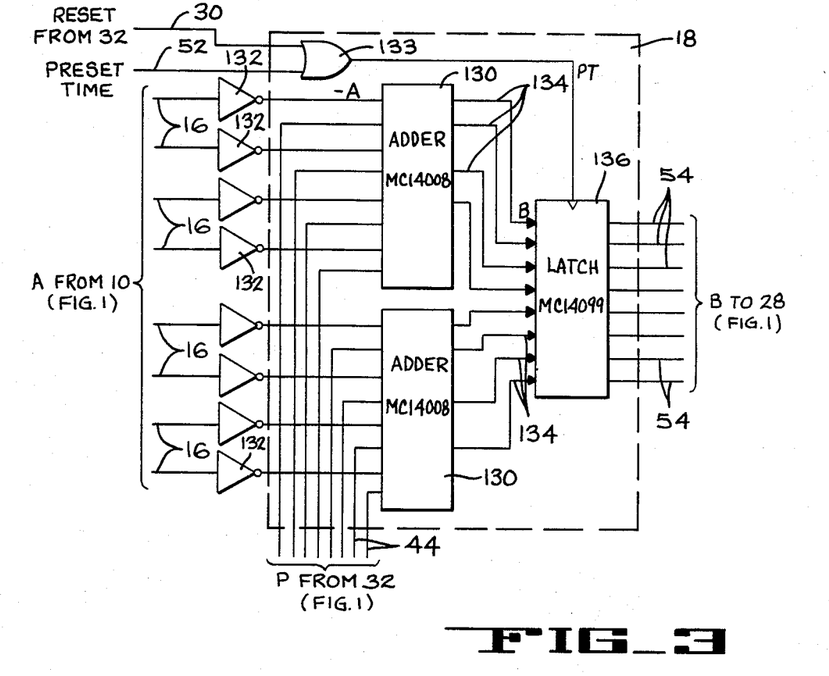
Figure 4:
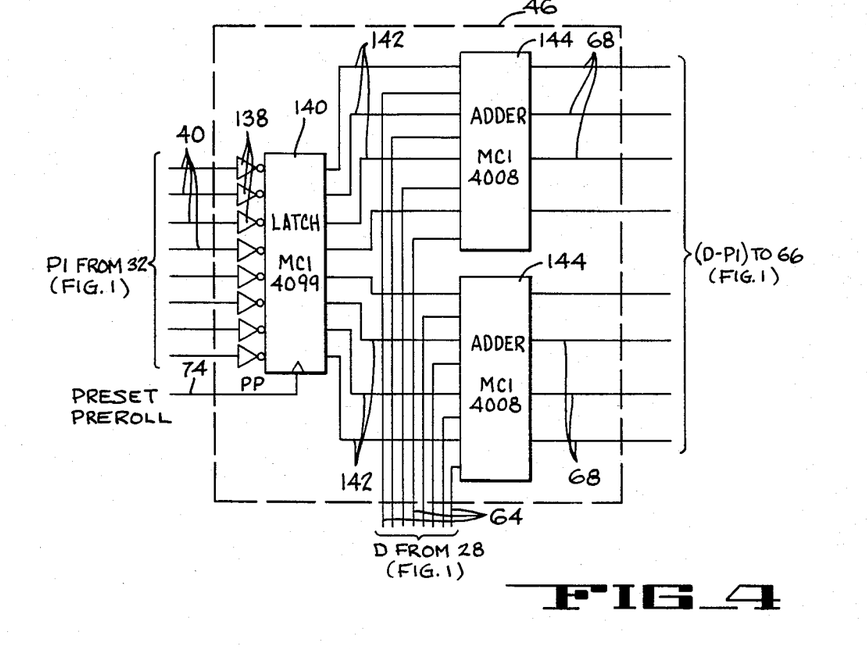

Referring now to the more detailed diagram of FIG. 3 it is seen that when a reset time control signal R is applied on line 30 via OR gate 133 an output signal on lines 134 from adder 130 is latched in latch 136. The latter output signal corresponds to the inverted value (−A) on lines 16 since the second input signal P on lines 44 of adder 130 is a low signal and thus equal to zero as described above. Thus the corresponding output signal on lines 54 corresponds to (−A).

Now a further operation mode will be described in which cue markers are entered and stored in the cue marker storage, also referred to as memory 20 of FIG. 1. When it is desired to store a particular cue marker in the memory 20, the previously mentioned set cue control signal SC on line 24 is aplied to storage 20. The latter signal represents a write in memory signal. Simultaneously the previously mentioned cue select control signal CS on line 22 is applied to storage 20 which signal represents a particular address at which the selected cue marker will be stored. It will be understood that depending on the capacity of the particular cue marker storage utilized the address must contain a sufficient number of bits necessary to identify the particular address location. For example the random access memory utilized in the preferred embodiment as the cue marker storage 20 has a capacity of 4,096 bits. Consequently up to 128 32-bit cue markers may be stored in memory 20. Upon receiving the aboveidentified control signals CS and SC on lines 22 and 24, respectively, the content of the 32-bit counter 10 is transferred on line 16 and stored in memory 20 at the particular address designated by the address line 22 in a manner well known in the art.

The next operation mode of the circuit of FIG. 1 to be described is related to entering and storing in memory 20 an external cue marker CE received on line 36. In the preferred embodiment an external cue marker value CE is received as a time value and it is applied to the time to binary converter circuit 32 of FIG. 1. As previously described, depending on the particular recording format utilized, a corresponding hi/low level combination of the control signals FS and DFE is applied on lines 80,82 to the time to binary converter circuit 32. The converter 32 accordingly converts the time value on line 36 to a corresponding binary value on line 42 which is then applied to the binary adder circuit 48. The binary adder 48 also receives the offset signal B on line 54 which is inverted by inverter 92. Adder 48 in turn provides a sum of the received signals equal to C=(CE−B) on its output line 56. It will be understood that the latter signal on line 56 corresponds to the originally received external cue marker CE which is modified by the offset signal B in a sense opposite to the previously described modification of signal A or C, respectively, by offset B. The thusly modified signal on line 56 is applied to the previously mentioned cue marker memory 20. Upon applying the address signal cue select CS on line 22 and set cue control signal SC on line 24 the cue marker C=(CE−B) is then stored in memory 20 at the address location designated by signal CS.

A selected cue marker C stored in memory 20 is displayed on display 90 of FIG. 1 as follows. The particular address at which the selected cue marker C to be displayed is stored in memory 20 is applied as signal CS on address line 22. The selected cue marker value C is then obtained on the output line 26 from memory 20 and applied to one input of the binary adder 28. The cue marker C on line 26 is modified by the offset signal B latched in the binary adder and latch circuit 18 in a manner previously described. The respective values B and C are summed and the resulting sum is applied on line 62 to the data selector 66. Upon applying an appropriate dispay select control signal DS on line 78, the data selector applies the signal from input line 62 to its output line 70. The signal on line 70 is then converted in the binary to time converter circuit 72 and thereafter displayed on display 90 in the previously described manner.

Now an operation mode will be described in which a distance and direction to a selected cue marker is determined and displayed by the circuit of FIG. 1. As it has been previously described, the binary adder 28 receives the inverted tape time information signal (−A) in binary form on line 58, and the selected cue marker value C on line 26 respectively. The adder 28 provides a difference value (C−A) which value corresponds to the distance D and direction in which the tape has to move to obtain a point on tape corresponding to the selected cue marker. The value D is applied on line 64 to the data selector 66 which upon receiving a corresponding display select control signal DS on line 78 provides an output signal on line 70 corresponding to the signal on line 62. The binary signal on line 70 is then converted to a corresponding time signal in the previously described manner by the converter 72 and thereafter displayed in time format on display line 90.

In applications where it is desired to modify the distance and direction to a cue marker by a known preroll value, the circuit of FIGS. 1 and 4 will operate as follows. A predetermined preroll time P1 is applied as a time value on line 34 to the time to binary converter circuit 32. The latter circuit converts the received time signal on line 34 to a corresponding binary signal in a previously described manner and applies the converted signal to line 40. As shown in FIG. 4 the binary signal P1 on lines 40 is applied via inverters 138 to the latch 140 of the latch and binary adder circuit 46. Upon applying a preset preroll control signal PP on line 74 which signal corresponds to a latch enable signal, the value (−P1) is latched into the latch 140. The binary adder 144 of circuit 46 receives both the latched signal (−P1) and the previuosly described signal D on line 64. The adder 144 provides a difference signal (D−P1) and applies it to line 68. It will be understood from the foregoing description that the resulting signal on line 68 represents the previously described distance and direction to park. As previously mentioned the above-mentioned preroll time is necessary for example for two or more tape recorders to obtain synchronization prior to obtaining a cue marker such as useful for transferring a portion of the recorded information from one magnetic tape present in one device to another tape in another recording device. In response to an appropriate display select control signal DS on line 78 of FIG. 1 applied to the data selector 66 the signal on line 68 is transferred to line 70 and thereafter it is converted into time format by converter 72 and displayed on display 90 in the previously described manner. It will be understood from the foregoing description that signal from line 64 as well as signal (D−P1) on line 68 may be respectively applied to tape drive mechanism as control signals to move the tape in a predetermined direction and distance to obtain a point on tape designated by the selected cue marker.

It is noted with reference to the foregoing description that while the offset signal B utilized in the preferred embodiment is provided as a value (P−A), alternatively it may be obtained as a value (A−P).

It is also noted that instead of modifying the measured tape time A and stored cue values C by offset B in one sense, such as by adding value B to A and C, respectively, alternatively the value B may be subtracted therefrom. However in the latter case the external cue values CE, prior to storing in the memory, will have to be modified by value B in the opposite sense, that is by adding value B thereto rather than subtracting it therefrom as it has been described in the preferred embodiment.

It will be appreciated that the counter 10, memory 20, and the respective latches of circuits 18 and 46 are preferably implemented as non-volatile devices.

As an alternative embodiment some or all of the above-described elements shown in FIG. 1 with the exception of the display driver 86 and display 90 may be implemented by a microcomputer and memory where the microcomputer is programmed to perform the various operation steps and modes of operation described in the foregoing specification.

It will be appreciated from the foregoing description that the above-described and other values related to tape time may be displayed as being preset to a desired value or reset without the need of changing or modifying the tape time as being measured or counted within the tape timer device. It will be also appreciated that stored cue marker values also may be displayed as related to preset or reset signals while the actual stored cue marker values remain unchanged.

While preferred embodiments of the invention have been described above and are illustraed in drawings, it will be appreciated that a number of alternatives and modifications may be made which will fall within the scope of the appended claims.

What is claimed is:

1. A magnetic tape timer apparatus comprising;
a first means coupled to receive a signal corresponding to movement of a magnetic tape in a magnetic tape recording/reproducing device, said first means having an output coupled to provide an output signal corresponding to a position of said magnetic tape within said tape recorder with respect to a selected reference position, said output signal indicating tape time;
a second means coupled to receive said output signal of said first means and a preset or reset input signal, respectively corresponding to a change in said selected reference position, said second means being coupled to provide an offset signal which corresponds to a difference between said output signal of said first means occuring at a time of receiving said preset or reset signal, respectively, and between said preset or reset signal;
a third means coupled to receive and store said offset signal; and
a fourth means coupled to receive and combine said output signal of said first means and said offset signal from said third means, respectively, and to provide a first output signal corresponding to said output signal of said first means which is modified by said offset signal to obtain a modified tape time signal related to said changed reference position.

2. The apparatus of claim 1 further comprising a storage means for storing a plurality of cue markers each indicating a specific location on said magnetic tape with respect to said selected reference position, said storage means having an output coupled to an input of said fourth means; and wherein said fourth means is coupled to receive and combine a selected cue marker from said storage means and said offset signal from said third means respectively, and to provide a second output signal corresponding to a modified cue marker related to said changed reference position.

3. The apparatus of claim 2 wherein said fourth means is coupled to provide a third output signal corresponding to a difference between said output signal of said first means and a selected cue marker stored in said storage means, said third output signal indicating a distance and direction to said selected cue marker at an instant position of said tape.

4. The apparatus of any of claims 1, 2 or 3 further comprising a display means coupled to receive and display said first, second or third output signal of said fourth means, respectively.

5. The apparatus of claim 2 wherein said storage means has an input coupled to said output of said first means, said input being coupled to receive each said cue marker as a respective output signal of said first means in response to a cue select control signal applied to said storage means and to store said cue marker at a location designated by a set cue control signal applied to said storage means.

6. The apparatus of claim 2 further comprising a fifth means coupled to receive and combine a first input signal corresponding to an external cue marker related to said changed reference position and a second input signal corresponding to said offset signal from said third means, said fifth means having an output providing an output signal corresponding to said external cue marker modified by said offset signal in a sense opposite to said modification of the output signal of said first means by said offset signal to obtain an external cue marker related to said selected reference position and wherein said fifth means is coupled to an input of said storage means.

7. The apparatus of claim 3 further comprising a sixth means coupled to receive and store a preroll signal, and a seventh means coupled to receive and combine said stored preroll signal from said sixth means and said third output signal of said fourth means, respectively, said seventh means coupled to provide an output signal coresponding to the difference of its respective input signals in response to a preset preroll control signal applied thereto, said output signal of the seventh means indicating a distance and direction to park.

8. The apparatus of claim 3 or 7 further comprising a binary to time converter circuit coupled to receive any one output signal of said fourth means, or said output signal of said seventh means, respectively as a binary signal, said binary to time converter circuit being coupled to convert said binary signal into a corresponding time signal.

9. The apparatus of claim 1, 6 or 7 wherein said preset signal, external cue marker or preroll signal are respectively received by said tape timer apparatus as time signals, and wherein said apparatus further comprises a time to binary converter means having respective inputs coupled to receive said time signals, said converter means being coupled to convert said received time signals into corresponding binary signals and to apply said binary signals to said second, fifth and sixth means, respectively.

10. The apparatus of claim 9 wherein said tape timer apparatus is utilized in a television tape recorder/reproducer and wherein said time to binary converter means is coupled to provide a desired rate of conversion corresponding to a particular type of television signal utilized.

11. The apparatus of claim 8 wherein said tape timer apparatus is utilized in a television tape recorder/reproducer and wherein said binary to time converter means is coupled to provide a desired rate of conversion corresponding to a particular type of television signal utilized.

12. The apparatus of claim 2 wherein both said first and second output signals of said fourth means are binary signals, respectively, and wherein said apparatus further comprises a binary to time signal converter means coupled to said fourth means for converting said binary output signals into corresponding time signals and a display means coupled to display said time signals.

13. A magnetic tape timer comprising:
a counter means coupled to receive a signal corresponding to longitudinal movement of a magnetic tape in a magnetic recording/reproducing device, said counter means providing an output signal in response to said input signal corresponding to a longitudinal position of said tape within said device with respect to a selected reference position;

a first means coupled to receive a preset or reset signal corresponding to a change in said selected reference position, to receive said output signal of said counter means and to provide and store an offset signal corresponding to a difference between its respective input signals;

a second means coupled to receive and combine said stored offset signal from said first means and said output signal of said counter means and to provide a first output signal corresponding to said output signal of said counter means modified by said offset signal to relate to said changed reference position; and a display means coupled to receive and display said first output signal of said second means.

14. The magnetic tape timer of claim 13 further comprising:
a cue marker storage means coupled to store a plurality of cue markers each indicating a particular location of said magnetic tape with respect to said selected reference position, said second means being further coupled to receive and combine a selected cue marker from said cue marker storage means and said offset signal from said first means, respectively, and to provide a second output signal corresponding to said selected cue marker which is modified by said offset signal to relate to said changed reference position; and wherein said display means is coupled to receive and display said second output signal of said second means.

15. The magnetic tape timer of claim 13 further comprising:
a cue marker storage means coupled to store a plurality of cue markers each indicating a particular location on said magnetic tape with respect to said selected reference position;

said second means being further coupled to receive a selected cue marker value from said cue marker storage means and to provide a third output signal corresponding to a difference between said output signal of said counter means and said selected cue marker value, said difference corresponding to a distance and direction on the magnetic tape at an instant postion thereof to a loction indicated by said selected cue marker; and wherein said display means is further coupled to receive and display said third output signal of said second means.

16. The magnetic tape timer of claim 15 wherein said cue marker storage circuit is coupled to receive an output signal of said counter means in response to a first control signal applied thereto and to store said received cue marker at an address designated by a second control signal applied thereto.

17. The magnetic tape timer of claim 14 or 15 further comprising a cue marker modifying circuit coupled to receive and combine an external cue marker value related to said changed reference position and said stored offset signal from said first means, said cue marker modifying circuit having an output providing an output signal corresponding to said external cue marker value modified by said offset signal in a sense opposite to said modification of the output signal of the counter means by said offset signal to obtain an external cue marker related to said selected reference position and wherein said output of said cue marker modifying circuit is coupled to an input of said cue marker storage circuit.

18. A magnetic tape timer apparatus comprising:
a counter means coupled to receive a signal corresponding to movement of a magnetic tape in a magnetic tape recorder/reproducer, said counter means providing an output signal corresponding to a position of said magnetic tape within said recorder/reproducer with respect to a selected reference position;

a storage means coupled to receive and store a plurality of selected cue markers therein, each said cue marker indicating a particular location on said magnetic tape with respect to said selected reference position;

a first summing means coupled to receive a preset or reset signal indicating a change in said reference position and said output signal of said counter means, respectively, and to provide and store an offset signal as a difference between said preset or reset signal and said counter output signal at a time of receiving said reset or preset signal, respectively;

a second means coupled to receive said output signal from said counter means and said offset signal from said first summing means and to provide responsively a first output signal corresponding to said output signal of said counter means modified by said offset signal to relate to said changed reference position;

said second means being further coupled to receive a selected cue marker value from said storage means and to provide a second output signal as a difference between said selected cue marker value and said output signal of the counter means, said second output signal corresponding to a distance and direction of magnetic tape movement necessary to obtain a position thereof corresponding to said selected cue marker value.

19. The apparatus of claim 18 wherein said second means is further coupled to combine said selected cue marker value and said offset signal, to provide a third output signal corresponding to a modified cue marker value related to said changed reference position.

20. The apparatus of claim 19 wherein said preset signal is received as a time value wherein said apparatus further comprises a time to binary converter means for converting said time value into a corresponding binary value, said time to binary converter having an output coupled to an input of said first summing means.

21. The apparatus of claim 19 further comprising a binary to time converter means having an input coupled to receive said first, second and third output signal respectively provided by said second means for providing corresponding time values; and a display means having an input coupled to an output of said binary to time converter means for displaying said time values.

22. A method of indicating tape time, comprising the steps of:
receiving a signal corresponding to movement of a magnetic tape in a magnetic tape recording/reproducing device, and responsively providing a tape time signal corresponding to the position of said magnetic tape in said device with respect to a selected reference position;

receiving a preset or reset signal corresponding to a change in said reference position;

providing an offset signal as a difference between said tape time signal coincident with the time of receiving said preset or reset signal and between said preset or reset signal, respectively;

storing said offset signal until a new preset or reset signal is obtained; and, modifying a current value of said tape time signal by said offset signal to obtain a modified tape time signal with respect to said change in said reference position.

23. The method of claim 22 further comprising the steps of:
storing a plurality of cue markers each indicating a particular location on said magnetic tape with respect to said selected reference position;

retrieving a selected stored cue marker; and modifying said retrieved cue marker by said offset signal to provide a cue marker modified with respect to said change in said reference position.

24. The method of claim 22 further comprising the steps of;
storing a plurality of cue markers each indicating a particular location on said magnetic tape with respect to said reference position;

retrieving a selected stored cue marker; and providing a difference between said tape time signal and said retrieved cue marker to obtain a signal corresponding to the distance and direction to said selected cue marker on said magnetic tape from a current position thereof.

25. The method of claim 23 or 24 wherein the step of storing said cue markers further comprises the steps of:
receiving each said cue marker as said tape time signal related to said selected reference positon coincidently with a first control signal; and storing said tape time signal in a storage means at a location defined by a second control signal.

26. The method of claim 23 or 24 wherein the step of storing said cue markers further comprises the steps of:
receiving a cue marker as an external tape time signal related to said changed reference position;

modifying said external tape time signal with said offset signal in a sense opposite to said step of modifying a current value of said tape time signal by said offset signal to obtain a modified cue marker related to said selected reference position unchanged by said preset or reset signal; and storing said modified cue marker in a storage means in response to a first control signal at a location defined by a second control signal.

27. The method of claim 26 wherein said external tape time signal is provided as a time value, and wherein said method further comprises a step of converting said time values into binary values prior to the step of receiving said cue marker signal.

28. The method of claim 24 further comprising the steps of:

receiving and storing a preroll signal related to said changed reference position; and providing a difference signal between said signal corresponding to the distance and direction to said selected cue marker and said preroll signal to obtain a distance and direction to park.

29. The method of claim 22, or 28 wherein said preset signal, or preroll signal are respectively provided as time values, and wherein said method further comprises the step of converting said time values into binary values prior to the respective steps of receiving said respective signals.

30. The method of claim 22 further comprising the step of displaying said modified tape time signal.

31. The method of claim 23 further comprising the step of displaying said modified cue marker.

32. The method of claim 24 further comprising the step of displaying said signal corresponding to the distance and direction to said selected cue marker.

33. The method of claim 28 further comprising the step of displaying said signal corresponding to said distance and direction to park.

34. The method of any of claims 30 to 33 wherein said modified tape signal, said modified cue marker, said signal corresponding to the distance and direction to said selected cue marker, as well as said signal corresponding to said distance and direction to park are respectively provided as binary signals and wherein said method further comprises a step of converting said binary signals to time signals prior to said step of displaying said respective signals.

35. A method of providing tape time information comprising the steps of:

providing a count in response to a signal corresponding to the speed and direction of longitudinal movement of a magnetic tape in a magnetic recording/reproducing device, said count corresponding to a position of said tape within said device with respect to a selected reference position;

receiving a preset or reset signal corresponding to a change in said reference position;

providing and storing an offset signal obtained as a difference signal between said count coincident with receiving said preset or reset signal and between said preset or reset signal value; and modifying a current count by said offset signal to relate to said changed reference position.

36. The method of claim 35 further comprising the steps of:

storing a plurality of cue markers in a memory, each cue marker indicating a particular location on said magnetic tape with respect to said selected reference position;

retrieving a selected cue marker from said memory; and modifying said retrieved cue marker by said offset signal to relate to said changed reference position.

37. The method of claim 36 further comprising the step of providing a distance and direction signal to said selected cue marker as a difference signal between said retrieved cue marker and said current count.

38. The method of claim 36 wherein said current count modified by said offset signal, said retrieved cue marker modified by said offset signal and said distance and direction to a selected cue marker are respectively provided as binary signals and wherein said method further comprises the steps of respectively converting said binary signals into time signals and displaying said time signals.

* * * * *